(12) United States Patent
Park et al.

(10) Patent No.: US 12,567,979 B2
(45) Date of Patent: Mar. 3, 2026

(54) INTERPERSONAL NON-CONTACT IDENTIFICATION SYSTEM USING WIRELESS COMMUNICATION

(71) Applicants: SOONCHUNHYANG UNIVERSITY INDUSTRY ACADEMY COOPERATION FOUNDATION, Chungchengnam-do (KR); UNIVERSITY-INDUSTRY FOUNDATION OF SEOUL UNIVERSITY OF FOREIGN STUDIES, Seocho-gu (KR)

(72) Inventors: Keun Dug Park, Songpa-gu (KR); Heung Youl Youm, Seocho-Gu (KR)

(73) Assignees: SOONCHUNHYANG UNIVERSITY INDUSTRY ACADEMY COOPERATION FOUNDATION, Asan-si (KR); UNIVERSITY-INDUSTRY FOUNDATION OF SEOUL UNIVERSITY OF FOREIGN STUDIES, Seocho-Gu (KR)

( * ) Notice: Subject to any disclaimer, the term of this patent is extended or adjusted under 35 U.S.C. 154(b) by 272 days.

(21) Appl. No.: 18/260,864

(22) PCT Filed: Jan. 12, 2021

(86) PCT No.: PCT/KR2021/000379
§ 371 (c)(1),
(2) Date: Jul. 10, 2023

(87) PCT Pub. No.: WO2022/149642
PCT Pub. Date: Jul. 14, 2022

(65) Prior Publication Data
US 2024/0073031 A1      Feb. 29, 2024

(30) Foreign Application Priority Data

Jan. 11, 2021    (KR) ........................ 10-2021-0003442

(51) Int. Cl.
*H04L 29/06*      (2006.01)
*H04L 9/32*       (2006.01)

(52) U.S. Cl.
CPC .................................. *H04L 9/3263* (2013.01)

(58) Field of Classification Search
CPC ..................................................... H04L 9/3263
See application file for complete search history.

(56) References Cited

U.S. PATENT DOCUMENTS

2010/0058058 A1      3/2010   Busari
2016/0226837 A1*     8/2016   Kim ...................... H04L 9/3234
(Continued)

FOREIGN PATENT DOCUMENTS

KR      1020060032888          4/2006
KR      1020170133463 A        12/2017
(Continued)

OTHER PUBLICATIONS

International Search Report dated Sep. 14, 2021 for corresponding International Application No. PCT/KR2021/000379, 5 pages.

*Primary Examiner* — Evans Desrosiers
(74) *Attorney, Agent, or Firm* — MH2 Technology Law Group, LLP

(57)      ABSTRACT

A person-to-person non-face-to-face identity verification system using wireless communication is disclosed. The non-face-to-face identity verification system according to the present invention mutually exchanges a first certificate signed with a user identifier and a private key of a terminal user and a second certificate signed with a user identifier and a private key of a terminal user of a second terminal from the second terminal, verifies the received certificates with a (Continued)

public key of each terminal registered on on/off-chain, combines the verified certificate and a self-generated certificate to generate an integrated certificate. Accordingly, since the electronically signed confirmations are exchanged with each other and verified with public keys registered on the on/off-chain, it is possible to exchange the verified certificates non-face-to-face.

9 Claims, 11 Drawing Sheets

(56) References Cited

U.S. PATENT DOCUMENTS

| | | | | |
|---|---|---|---|---|
| 2017/0257213 A1* | 9/2017 | Li | .......................... | H04L 9/3247 |
| 2018/0343114 A1 | 11/2018 | Ben-Ari | | |
| 2019/0347433 A1* | 11/2019 | Chakravorty | ............. | H04L 9/30 |
| 2022/0224677 A1* | 7/2022 | Chen | ................... | H04L 63/0435 |

FOREIGN PATENT DOCUMENTS

| | | |
|---|---|---|
| KR | 1020190111042 A | 10/2019 |
| KR | 1020200133881 A | 12/2020 |

* cited by examiner

Figure 7:
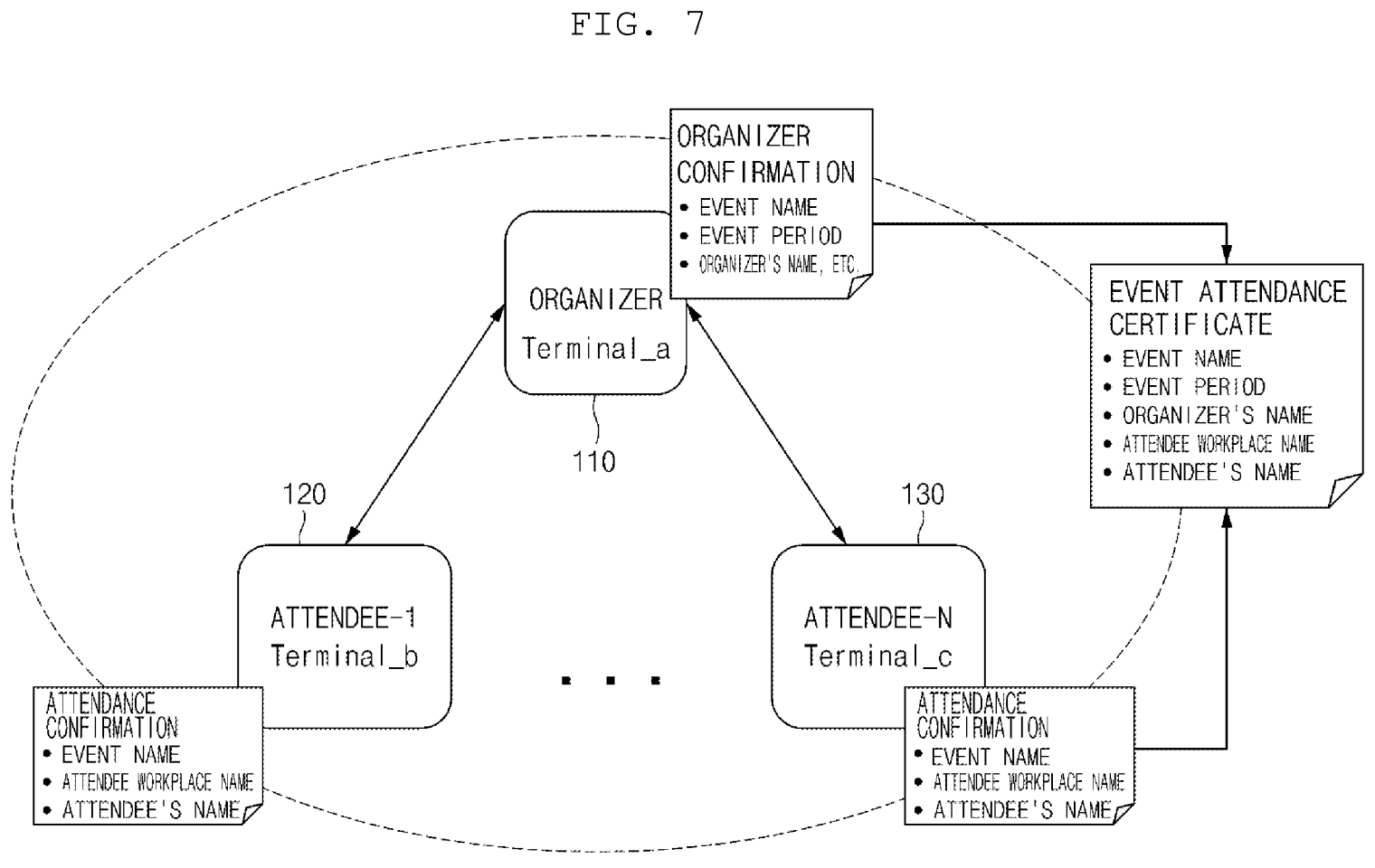

EVENT ATTENDANCE
CERTIFICATE
• EVENT NAME
• EVENT PERIOD
• ORGANIZER'S NAME
• ATTENDEE WORKPLACE NAME
• ATTENDEE'S NAME

ORGANIZER
CONFIRMATION
• EVENT NAME
• EVENT PERIOD
• ORGANIZER'S NAME, ETC.

ORGANIZER
Terminal_a
110

ATTENDEE-N
Terminal_c
130

ATTENDANCE
CONFIRMATION
• EVENT NAME
• ATTENDEE WORKPLACE NAME
• ATTENDEE'S NAME

ATTENDEE-1
Terminal_b
120

ATTENDANCE
CONFIRMATION
• EVENT NAME
• ATTENDEE WORKPLACE NAME
• ATTENDEE'S NAME

Figure 9:
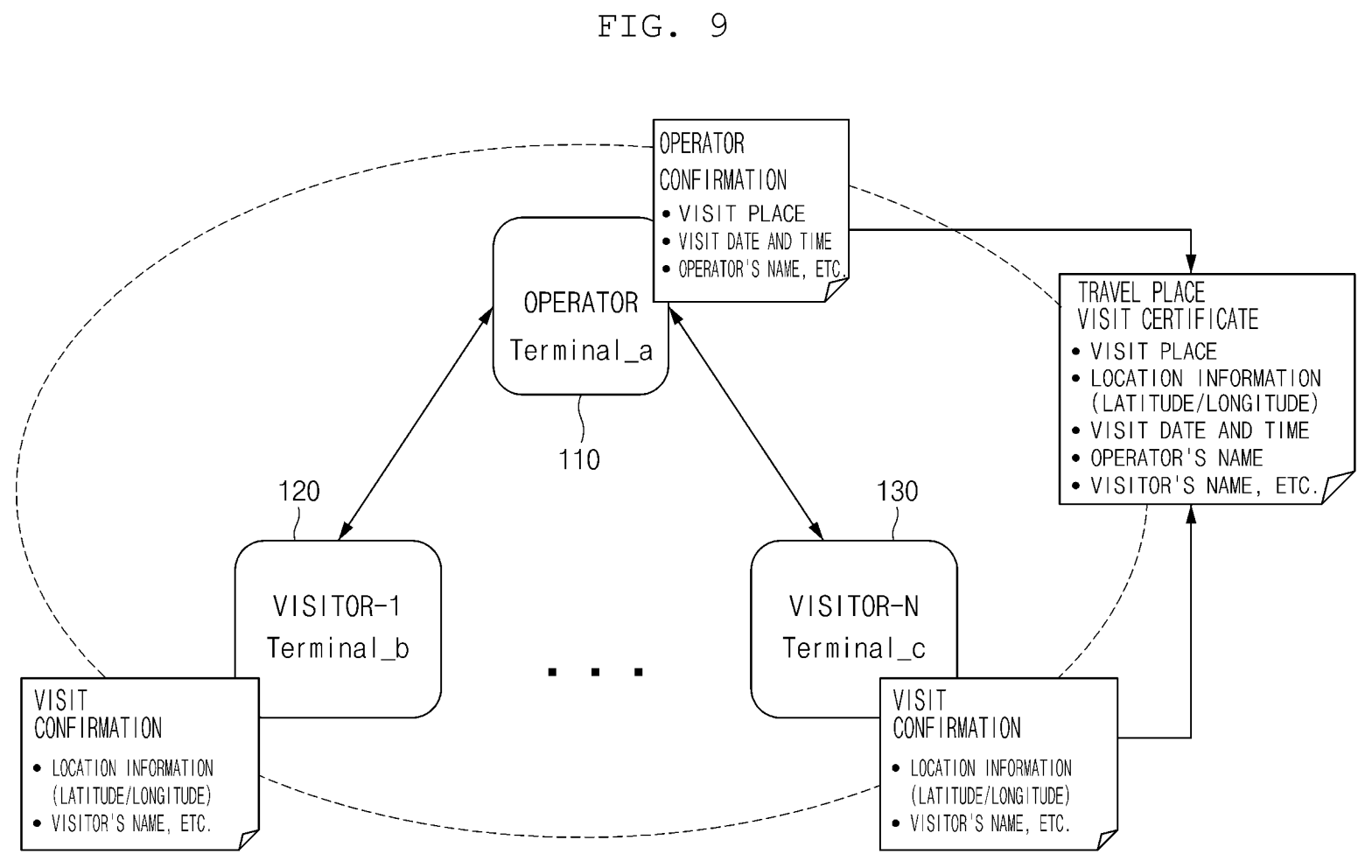

TRAVEL PLACE
VISIT CERTIFICATE
• VISIT PLACE
• LOCATION INFORMATION
  (LATITUDE/LONGITUDE)
• VISIT DATE AND TIME
• OPERATOR'S NAME
• VISITOR'S NAME, ETC.

OPERATOR
CONFIRMATION
• VISIT PLACE
• VISIT DATE AND TIME
• OPERATOR'S NAME, ETC.

OPERATOR
Terminal_a
110

VISITOR-N
Terminal_c
130

VISIT
CONFIRMATION
• LOCATION INFORMATION
  (LATITUDE/LONGITUDE)
• VISITOR'S NAME, ETC.

VISITOR-1
Terminal_b
120

VISIT
CONFIRMATION
• LOCATION INFORMATION
  (LATITUDE/LONGITUDE)
• VISITOR'S NAME, ETC.

FIG. 10

INTERPERSONAL NON-CONTACT IDENTIFICATION SYSTEM USING WIRELESS COMMUNICATION

CROSS-REFERENCE TO RELATED APPLICATIONS

This application is a national stage application of Int'l Appl. No. PCT/KR2021/000379 filed 12 Jan. 2021 which claims priority to Korean Patent Application No. 10-2021-0003442 filed 11 Jan. 2021. The entire disclosures of each application are herein incorporated by reference.

TECHNICAL FIELD

The present invention relates to an identity verification system, and more particularly, to a person-to-person non-face-to-face identity verification system using wireless communication, in which personal information is not registered and only information required for verification is registered on on/off chain, and a certificate is verified with each public key on an individual terminal, thereby generating an integrated certificate.

BACKGROUND ART

The global blockchain-based identity authentication market is expected to grow 2.5 times from USD 10.1 billion (KRW 12 trillion) in 2021 to USD 25.2 billion (KRW 30 trillion) in 2025 (source: Herald Economy).

In general, the four categories of identity authentication are divided into simple authentication, identity authentication, credential, and object authentication. The simple authentication simplifies the current complex authentication steps into 1 or 2 steps, the identity verification is to verify and submit one's identity without a plastic certificate like a digital ID card, the credential is to submit a student's transcript or an employee's proof of employment without paper documents, and the object authentication is one-stop management by assigning IDs to objects such as port containers and organic food.

In particular, decentralized identifier (DID) has several advantages in that, for example, individuals can directly manage their own information and select and submit only the information necessary for authentication, the leakage of personal information through hacking is minimized, and the unauthorized use of personal information by companies is blocked.

Peer DID means pairwise DID or N-wise DID, and is not intended for global public identification targeting an unspecified number of people like anywise DID, so it is advantageous for identification and privacy protection between specific individuals.

On the other hand, distributed IDs, private and joint certificates, etc. are issued by operators and submitted certificates remotely and non-face-to-face using the Internet. However, since it can be used in fields that require real name verification based on laws, such as financial and public services, there are problems that it cannot be used in a person-to-person non-face-to-face identification system due to various inconveniences.

In other words, there is a problem that it takes a lot of time for a large number of people gathered in a specific place to exchange business cards and that the exchange is not carried out smoothly due to reasons such as exhaustion of business cards or non-bringing of business cards.

In addition, in various events (events/workshops/conferences/exhibitions) and meetings (clubs/alumni associations/meetings), it takes a lot of time for the organizer to check the presence of a large number of participants, and it is inconvenient to wait in line.

In addition, it takes a lot of time for professors at schools and academies to check the attendance of a large number of students in face-to-face classes, and it takes a lot of time for sellers to check the order/payment/pick-up of a number of buyers at food and beverage stores.

In addition, there is a problem that it is difficult to practice social distancing (e.g., keeping a distance of 2 m or more between individuals) suitable for the post-COVID-19 era when verifying identity between individuals.

SUMMARY OF INVENTION

Technical Problem

An object of the present invention to solve these problems is to provide a person-to-person non-face-to-face identity verification system using wireless communication that can verify identity between individuals at a short distance using wireless communication.

In addition, another object of the present invention is to provide a person-to-person non-face-to-face identity verification system using wireless communication that can verify a certificate generated by a user through directly inputting essential information using information registered on on/off-chain.

In addition, another object of the present invention is to provide a person-to-person non-face-to-face identity verification system using wireless communication capable of issuing and exchanging electronically signed certificates after individual identity verification.

In addition, another object of the present invention is to provide a person-to-person non-face-to-face identity verification system using wireless communication, in which user identifier, public key, copy of encryption key, and terminal identifier are stored without registering personal information on on/off-chain, and the certificate is verified with each public key in an individual terminal.

Solution to Problem

According to the present invention to solve these problems, there is provided a person-to-person non-face-to-face identity verification system using wireless communication, in which one or more of user registration information including user identifier, public key, copy of encryption key, and terminal identifier are registered on an off-chain or an on-chain, and which are operated for terminals in which the user registration information is registered to exchange electronically signed certificates, including: a first terminal which generates a first certificate signed with a user identifier and a private key of a terminal user, transmits the first certificate to a second terminal through short range communication, receives a second certificate signed with a user identifier of a terminal user of the second terminal and a private key from the second terminal, and verifies the received second certificate with a public key of the second terminal registered on on/off-chain; and a second terminal which generates a second certificate signed with a user identifier and a private key of a terminal user, transmits the second certificate to the first terminal through short range communication, receives the first certificate signed with a user identifier and the private key of the terminal user of the first terminal, and verifies the received first certificate with a public key of the first terminal registered on the on/off-chain, wherein when the received second certificate is verified, the first terminal combines the first certificate and the verified second certificate to generate a co-signed integrated certificate, and when the received first certificate is verified, the second terminal combines the second certificate and the verified first certificate to generate a co-signed integrated certificate.

The first or second terminal may include: a wireless communication module; a user app unit which keeps a certificate, a private key, and an original encryption key in the terminal, verifies a received certificate with a public key of the other terminal registered on the on/off-chain, and is operated to transmit the certificate signed with the user identifier of the terminal and the private key to the other terminal through the wireless communication module; and a control unit which combines, when the certificate transmitted from the other terminal in the user app unit is verified, the certificate signed with the user identifier generated in the terminal and the private key and the verified certificate received from the other terminal, and controls a terminal display unit to display the co-signed certificate of each terminal.

The user app unit may include: an encryption key management module which manages encryption keys; a personal information management module which receives an encryption key from the encryption key management module, and encrypts and decrypts personal information; and an identity certificate management module which receives personal information from the personal information management module at the time of generating a first or second certificate, receives a private key from the encryption key management module, generates an electronically signed certificate, and is operated to receive or transmit the electronically signed first or second certificate through the wireless communication module.

And the integrated certificate may be any one of a class attendance certificate, an event attendance certificate, a meeting attendance certificate, a travel place visit certificate, a food and beverage transaction certificate, and a digital business card.

Advantageous Effects of Invention

Accordingly, according to the person-to-person non-face-to-face identity verification system using wireless communication according to an embodiment, since electronically signed certificates are exchanged with each other and can be verified with a public key registered on on/off-chain, it is possible to exchange the verified certificates non-face-to-face.

In addition, according to the person-to-person non-face-to-face identity verification system using wireless communication according to an embodiment, since only minimum information necessary for verification is registered on on/off-chain and a certificate is issued using a personal terminal in which personal information is stored, it is possible to exchange the certificates verified by inputting only essential information.

In addition, according to the person-to-person non-face-to-face identity verification system using wireless communication according to an embodiment, since it is possible to generate a class attendance certificate for attendance check, a professor can quickly and accurately check the class attendance of a large number of students located in a lecture room at the same time.

In addition, according to the person-to-person non-face-to-face identity verification system using wireless communication according to an embodiment, since it is possible to generate an event attendance certificate capable of checking the event attendance, an organizer of an event, a workshop, a conference, an exhibition, or a meeting can quickly and accurately check the event attendance of a large number of attendees located in an event hall at the same time.

In addition, according to the person-to-person non-face-to-face identity verification system using wireless communication according to an embodiment, since it is possible to generate a meeting attendance certificate capable of checking the meeting attendance, an organizer of a club, an alumni association, or a society can quickly and accurately check the attendance of a large number of members located in a meeting place at the same time.

In addition, according to the person-to-person non-face-to-face identity verification system using wireless communication according to an embodiment, since it is possible to generate a travel place visit certificate capable of checking the travel place visit, an operator of a famous travel place (historical site, tourist attraction) can quickly and accurately check the visit of a large number of visitors located in a visit place at the same time.

In addition, according to the person-to-person non-face-to-face identity verification system using wireless communication according to an embodiment, since it is possible to generate a food and beverage transaction certificate, a food and beverage seller can quickly and accurately process orders of a large number of customers located in a store at the same time.

In addition, according to the person-to-person non-face-to-face identity verification system using wireless communication according to an embodiment, since it is possible to generate and exchange verified digital business cards, a large number of people located in an event, a workshop, a conference, an exhibition, or a meeting room can quickly and accurately exchange digital business cards at the same time.

BRIEF DESCRIPTION OF DRAWINGS

FIG. 1 is a diagram for explaining a function of a person-to-person non-face-to-face identity verification system using wireless communication of the present invention.

FIG. 3 is a reference diagram for explaining a main function of an app of the present invention.

FIG. 7 is a diagram for explaining a process of issuing an event attendance certificate according to another embodiment of the present invention.

FIG. 8 is a reference diagram for explaining a process of issuing a meeting attendance certificate according to another embodiment of the present invention.

FIG. 9 is a reference diagram for explaining a process of issuing a travel place visit certificate according to another embodiment of the present invention.

FIG. 10 is a reference diagram for explaining a process of issuing a transaction certificate according to another embodiment of the present invention.

DESCRIPTION OF EMBODIMENTS

Figure 2:
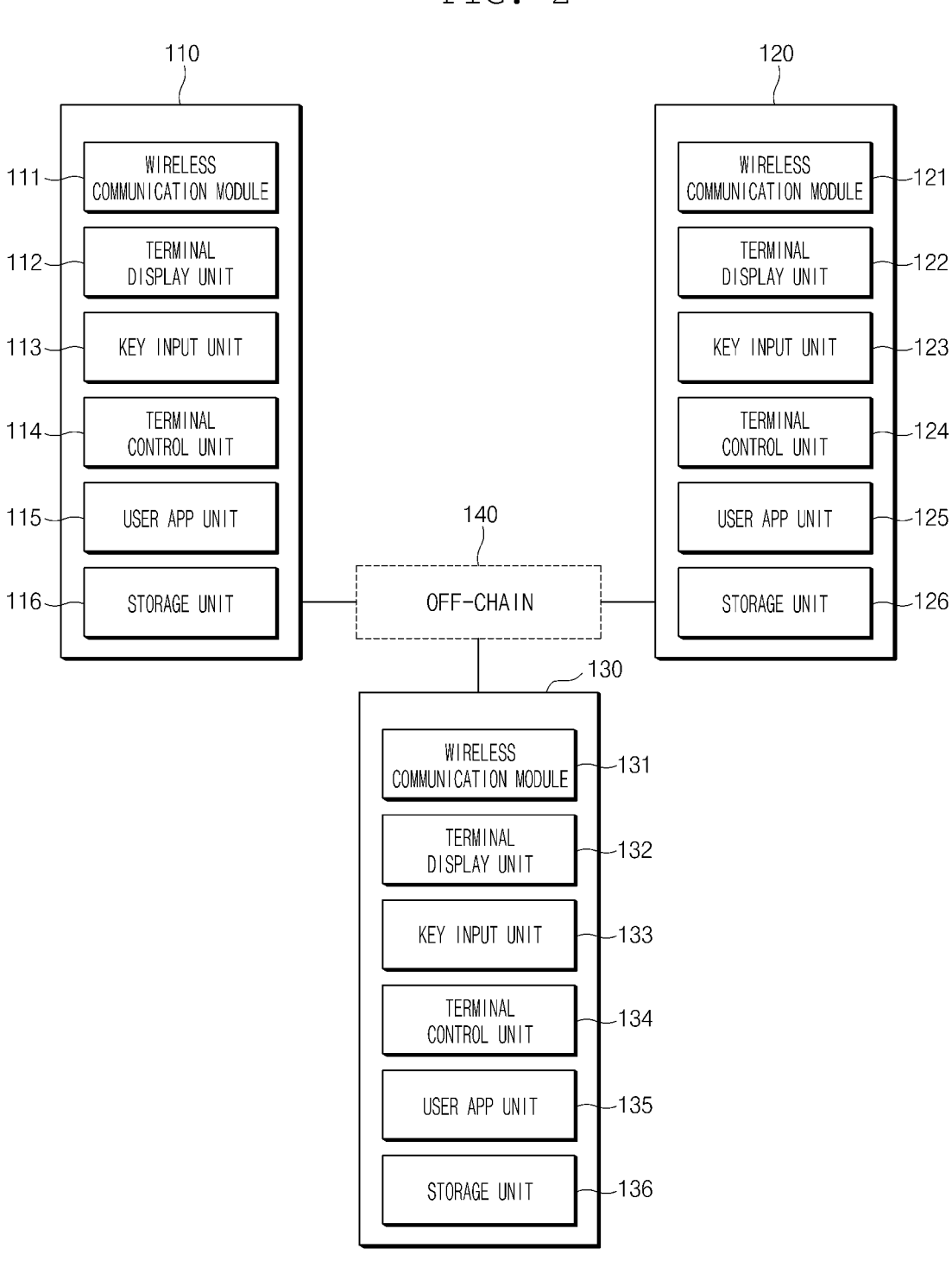
FIG. 2 is a diagram illustrating a main configuration of the person-to-person non-face-to-face identity verification system using wireless communication of the present invention.

The terms or words used in this specification and claims are not limited to the usual or dictionary meaning, and based on the principle that the inventor can appropriately define the concept of the term in order to explain his or her invention in the best way, it should be interpreted as meaning and concept consistent with the technical spirit of the present invention.

Throughout the specification, when a certain component is said to "include" a certain component, it means that it may further include other components without excluding other components unless otherwise stated. In addition, terms such as " . . . unit", " . . . portion", "module", and "device" described in the specification mean a unit that processes at least one function or operation, which may be implemented as a combination of hardware and/or software.

Throughout the specification, the term "and/or" should be understood to include all possible combinations from one or more related items. For example, "first item, second item, and/or third item" means a combination of all items that can be presented from two or more of the first, second, and third items, as well as the first, second or third item.

In each step throughout the specification, identification codes (e.g., a, b, c, . . . ) are used for convenience of explanation, the identification code does not limit the order of each step, and each step may occur in a different order than the specified order, unless the specific order is clearly stated in context. In other words, each step may occur in the same order as specified, may be performed substantially simultaneously, or may be performed in the reverse order.

First, terms used in the present invention are defined as having the following meanings.

"Off-Chain" is related to a blockchain system, but operates outside the blockchain system. Data stored on off-chain is shared only with participating nodes belonging to the same jurisdiction, this means that transactions are recorded outside the blockchain network, and the transaction means that it includes not only a transaction but also several actions.

"On-Chain" means a method of recording transaction history (data) inside the blockchain system, and data stored on on-chain means being shared by all participating nodes.

Hereinafter, an embodiment of the present invention will be described with reference to the accompanying drawings.

Figure 1:
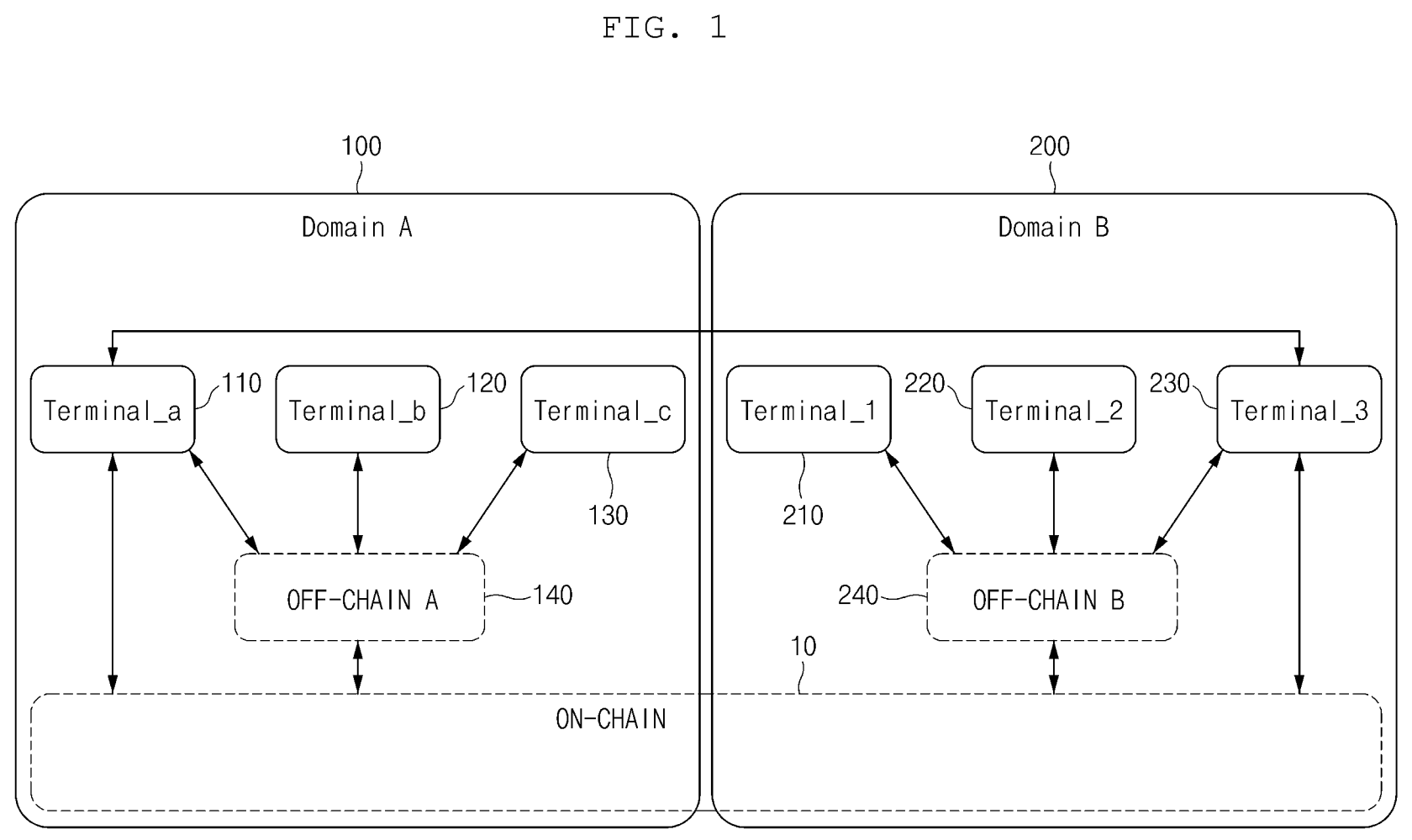

FIG. 1 is a diagram for explaining a function of a person-to-person non-face-to-face identity verification system using wireless communication according to the invention. As illustrated, according to the present invention, any one or more of user registration information including a user identifier, a public key, a copy of an encryption key, and a terminal identifier are registered on off-chain or on-chain, and electronically signed certificates are exchanged between terminals in which the user registration information is registered, thereby generating a final integrated certificate.

Referring to the drawing, a first terminal (Terminal_a) 110, a second terminal (Terminal_b) 120, and a third terminal (Terminal_c) 130 are operated in an area called a domain A 100, user registration information including a user identifier, a public key, a copy of an encryption key, and a terminal identifier is registered on off-chain A 140 and on-chain 10, electronically signed certificates are exchanged between registered terminals, and the certificates are verified using a public key on the on/off-chain.

In other words, the present invention has one characteristic in that the signed certificates are exchanged between the terminals registered on the on/off-chain, for the user registration information.

In addition, a fourth terminal (Terminal_1) 210, a fifth terminal (Terminal_2) 220, and a sixth terminal (Terminal_3) 330 are operated in an area called a domain B 200, user registration information including a user identifier, a public key, a copy of an encryption key, and a terminal identifier is registered on off-chain 240 and on-chain 10, electronically signed certificates are exchanged between registered terminals, and the certificates are verified using a public key on the on/off-chain.

When the terminal included in the domain A transmits and receives information to and from the terminal included in the domain B, the on-chain 10 is used for communication. In the drawing, it can be seen that the first terminal 110 and the sixth terminal 230 are connected to transmit and receive information to and from each other.

In other words, when information is registered only on the off-chain, it is possible to exchange information with each other only in the corresponding domain, and when it is necessary to exchange information with a terminal included in other domains, the on-chain is used.

Figure 3:
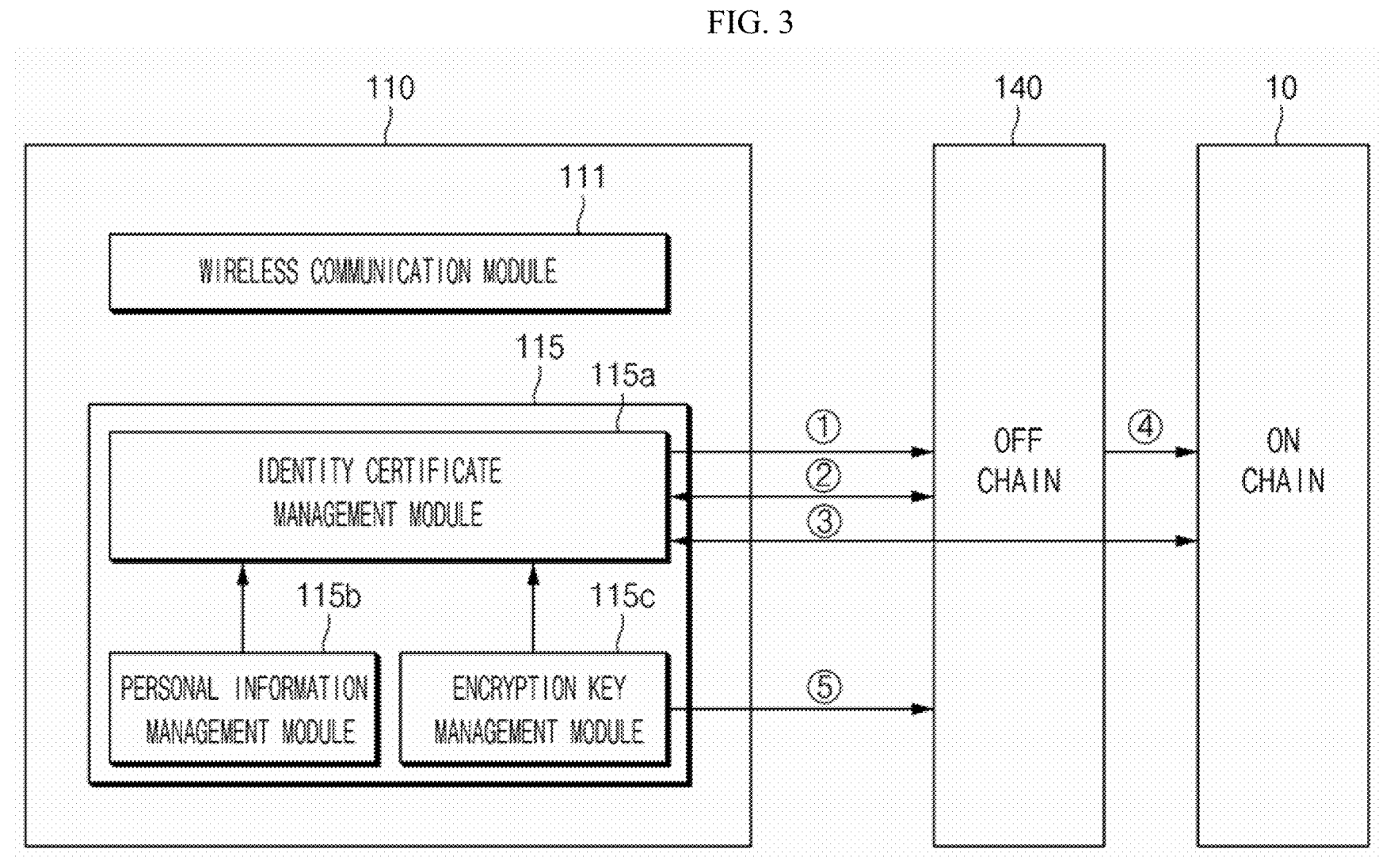

Referring to FIG. 3 which is a reference diagram for explaining a main function of an app of the present invention, information registered on the off-chain 140 from the terminal 110 is information of "user identifier, terminal identifier" indicated by ① and "copy of encryption key, public key" indicated by ⑤, and information registered on the on-chain 10 is configured with information ④ registered on the off-chain 140 and is a public key, a user identifier, a terminal identifier information, and the like.

Through such a configuration, each terminal ② verifies electronic signature in the off-chain 140, or ③ verifies electronic signature in the on-chain 10 when it is necessary to exchange information with the terminal of other domains.

To this end, the person-to-person non-face-to-face identity verification system using wireless communication according to the present invention may be configured with a terminal to include a user app unit which runs an application related to the present invention to exchange a certificate and performs verification, a control unit which controls it, and a wireless communication module.

Referring to FIG. 2 which is a reference diagram of a main configuration of the person-to-person non-face-to-face identity verification system using wireless communication according to the present invention, a terminal 110 may be a tablet, a smartphone, a smart pad, a smart watch, a PDA, or a dedicated terminal, and may operate to perform wireless communication and internet communication like a general smartphone.

In addition, since the present invention may use terminals all having the same configuration, the configuration of the first terminal 110 will be representatively described for convenience of explanation.

The user app unit 115 is installed by downloading and storing a related app through an app store or connecting to a web server (not illustrated) operating as a platform through a mobile communication network and downloading an application.

An application (hereinafter, referred to as app) in the present invention is configured with a GUI to register related information on the on/off-chain, generate a certificate, perform electronic signature, and verify a received certificate.

Preferably, in a process of installing the app, the application may be installed through an authentication process of the server operating on the web.

In other words, according to the present invention, the app may be downloaded and installed by connecting to a web server (not illustrated) operating as a recommended platform, but an app for each OS may be uploaded on an app store and distributed regardless of IOS or Android.

Since a process of downloading and installing such an app and an authentication step are general, detailed description thereof is omitted.

A wireless communication module 111 is configured to transmit and receive data through short range wireless communication within 40 m.

Since the present invention transmits, receives, and verifies a certificate non-face-to-face, it is preferable to use Bluetooth or Wi-Fi direct wireless communication.

As described above, in order to efficiently perform an operation of storing a certificate, a private key, and an original encryption key in the corresponding terminal, verifying a received certificate with a public key of the other terminal registered on on/off-chain, and transmitting an identifier and a private key of a user of the terminal to the other terminal through the wireless communication module, the app of the present invention is configured to operate with an encryption key management module 115*c*, a personal information management module 115*b*, and an identity certificate management module 115*a* (see FIG. 3).

The encryption key management module 115*c* manages an encryption key, the personal information management module 115*b* encrypts and decrypts personal information with an encryption key provided from the encryption key management module 115*c*, and the identity certificate management module 115*a* receives the personal information from the personal information management module 115*b* at the time of generating a substantial first or second certificate, receives a private key from the encryption key management module 115*c*, generates an electronically signed certificate, and is operated to receive or transmit the electronically signed first or second certificate through the wireless communication module 111.

A storage unit 116 stores various kinds of information necessary to operate the app of the present invention, that is, personal information of a terminal holder, a private key/public key, an original encryption key, a user identifier, a terminal identifier, a generated certificate, and the like.

Accordingly, when the app is running, the personal information management module 115*b* and the encryption key management module 115*c* read and use necessary information in the storage unit 116, respectively.

In addition, in the storage unit 116, when an integrated certificate issuing icon such as a class attendance certificate, an event attendance certificate, a meeting attendance certificate, a travel place visit certificate, a food and beverage transaction certificate, or a digital business card is set as the integrated certificate that can be used in the app, it is possible to easily use the icon needed according to the situation.

A terminal control unit 114 operates an application of the user app unit 115 according to the present invention, controls a terminal display unit 120 to perform displaying and the wireless communication module 110 to transmit an electronically signed certificate, and controls the terminal to receive and display the electronically signed certificate from the other terminal.

In addition, the terminal control unit 114 may display an icon capable of running an application on a display unit 112, and may perform automatic control to communicate with the other terminal by automatically running an application stored in the user app unit 115 when the icon is clicked.

Again, referring to FIG. 2, it is exemplified that the certificates are transmitted and received on the off-chain 140 with three terminals, but according to the present invention, three or more terminals can simultaneously transmit and receive certificates on the on/off-chain.

In addition, although three or more terminals simultaneously communicate, this is the same as the content transmitted and received between two terminals. Accordingly, hereinafter, the communication between the first terminal and the second terminal will be described.

In addition, according to the present invention, it is described that a certificate self-generated in a terminal is a first certificate, a certificate generated in the other terminal is a second certificate, and a certificate generated by combining the first certificate and the second certificate is an integrated certificate.

In other words, the identify certificate management module 115*a* of the first terminal 110 generates a first certificate signed with a user identifier and a private key of a user of the corresponding terminal, transmits the first certificate to the second terminal 120 through the wireless communication module 111, receives a second certificate signed with a user identifier and a private key of a user of the second terminal 120 from the second terminal 120, and verifies the received second certificate with a public key of the second terminal 120 registered on the on/off-chain.

In addition, the second terminal 120 generates a second certificate signed with a user identifier and a private key of a user of the corresponding terminal, transmits the second certificate to the first terminal 110 through the wireless communication module 111, receives a first certificate signed with a user identifier and a private key of a user of the first terminal 110 from the first terminal 110, and verifies the received first certificate with a public key of the first terminal 110 registered on the on/off-chain.

As described above, when the certificates transmitted and received between the first and second terminals are verified, the identity certificate management module 115*a* of each terminal combines the self-generated first certificate and the second certificate received from the other terminal to generate an integrated certificate.

In other words, when the certificate transmitted from the other terminal is verified, the control unit of each terminal combines the certificate signed with the user identifier and private key generated in the corresponding terminal and the certificate received from the other terminal to display the integrated certificate co-signed in each terminal on the terminal display unit or to store it in the storage unit.

Specifically, the first terminal 110 combines, when the received second certificate is verified, the self-generated first certificate and the verified second certificate to generate a co-signed integrated certificate, and stores it in the storage unit 116 or displays it on the terminal display unit 112. Also, the second terminal 120 combines, when the received first certificate is verified, the second certificate and the verified first certificate to generate an integrated certificate, and stores or display it.

Not-described reference numeral 114 means a key input unit for inputting information necessary to run an app according to the present invention.

A person-to-person non-face-to-face identity verification method using the above-described configuration will be described.

Figure 4:
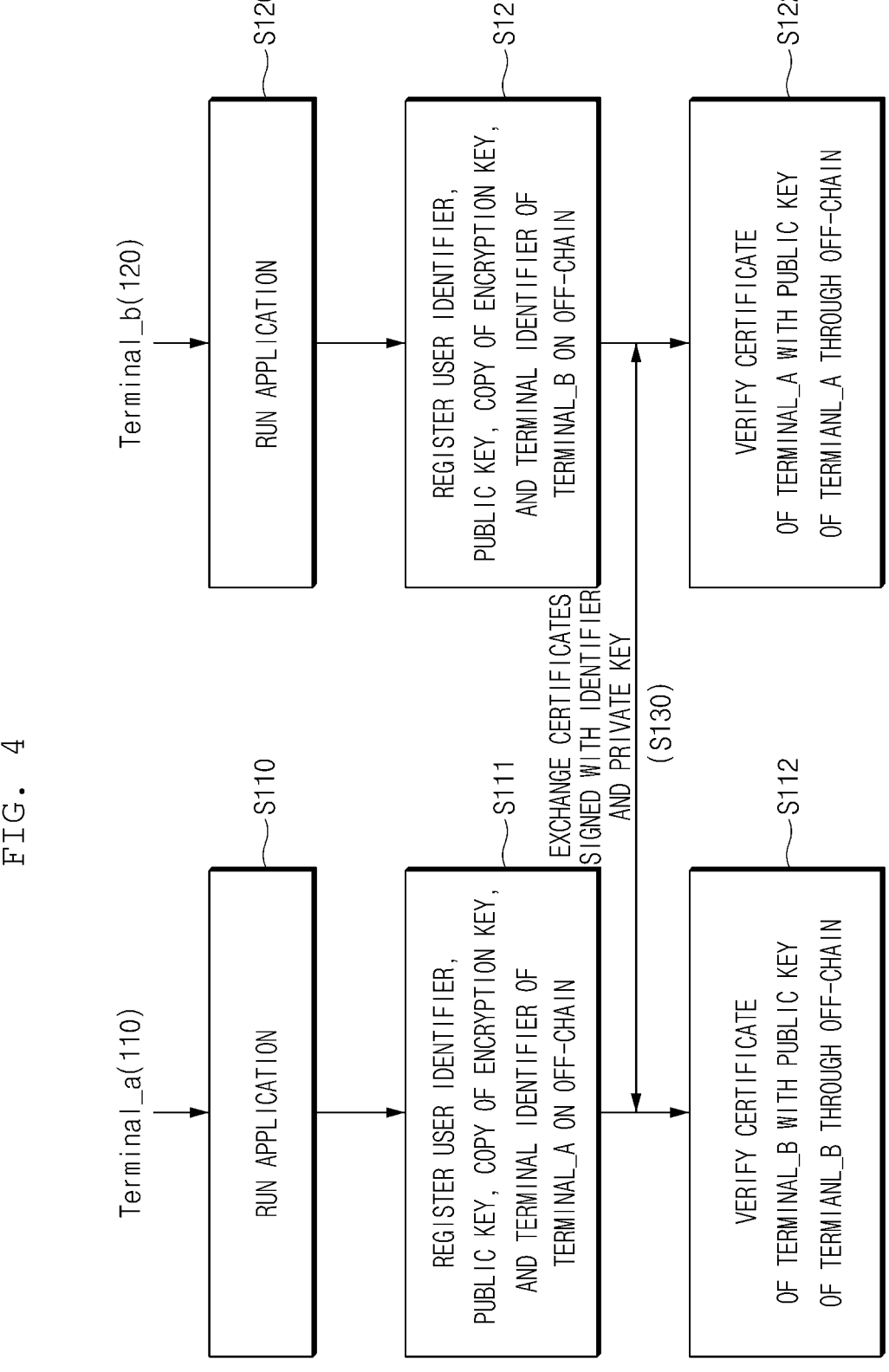
FIG. 4 is a flowchart for explaining a certificate verification method using off-chain.

FIG. 4 is a flowchart for explaining an identity verification using off-chain. As illustrated, according to the identity verification method, when an application of the user app unit 115 runs in the first terminal (Terminal_a) 110 (S110), information such as a user identifier, a public key, a copy of an encryption key, and a terminal identifier of the first terminal 110 is read and registered on the off-chain 140 (S111).

In addition, the second terminal (Terminal_b) 120 to transmit and receive a certificate to and from the first terminal 110 also runs an application of the user app unit 125 (S120), and information such as a user identifier, a public key, a copy of an encryption key, and a terminal identifier of the second terminal 120 is read and registered on the off-chain 140 (S121).

When the information is registered on the off-chain in Step S111 and S121, it is possible to exchange the certificates in the corresponding domain (S130).

In the exchange of the certificates in Step S130, the first certificate generated by inputting the necessary information in the first terminal 110 is electronically signed using a user identifier and a private key and is transmitted to the second terminal 120, and simultaneously, the second certificate generated by inputting the necessary information in the second terminal 120 is electronically signed using a user identifier and a private key and is transmitted to the first terminal 110.

When the certificates are exchanged in Step S130, each terminal control unit verifies the received certificate with a public key of the other terminal through the off-chain.

Specifically, the first terminal 110 verifies the received second certificate using the public key of the second terminal 120 registered on the off-chain 140 (S112), and the second terminal 120 verifies the received first certificate using the public key of the first terminal 110 registered on the off-chain 140 (S122).

When the verification of the received certificate of the other terminal is completed in Step S112 and Step S122, it is possible to generate the co-signed integrated certificate by combining the first certificate and the second certificate.

Figure 5:
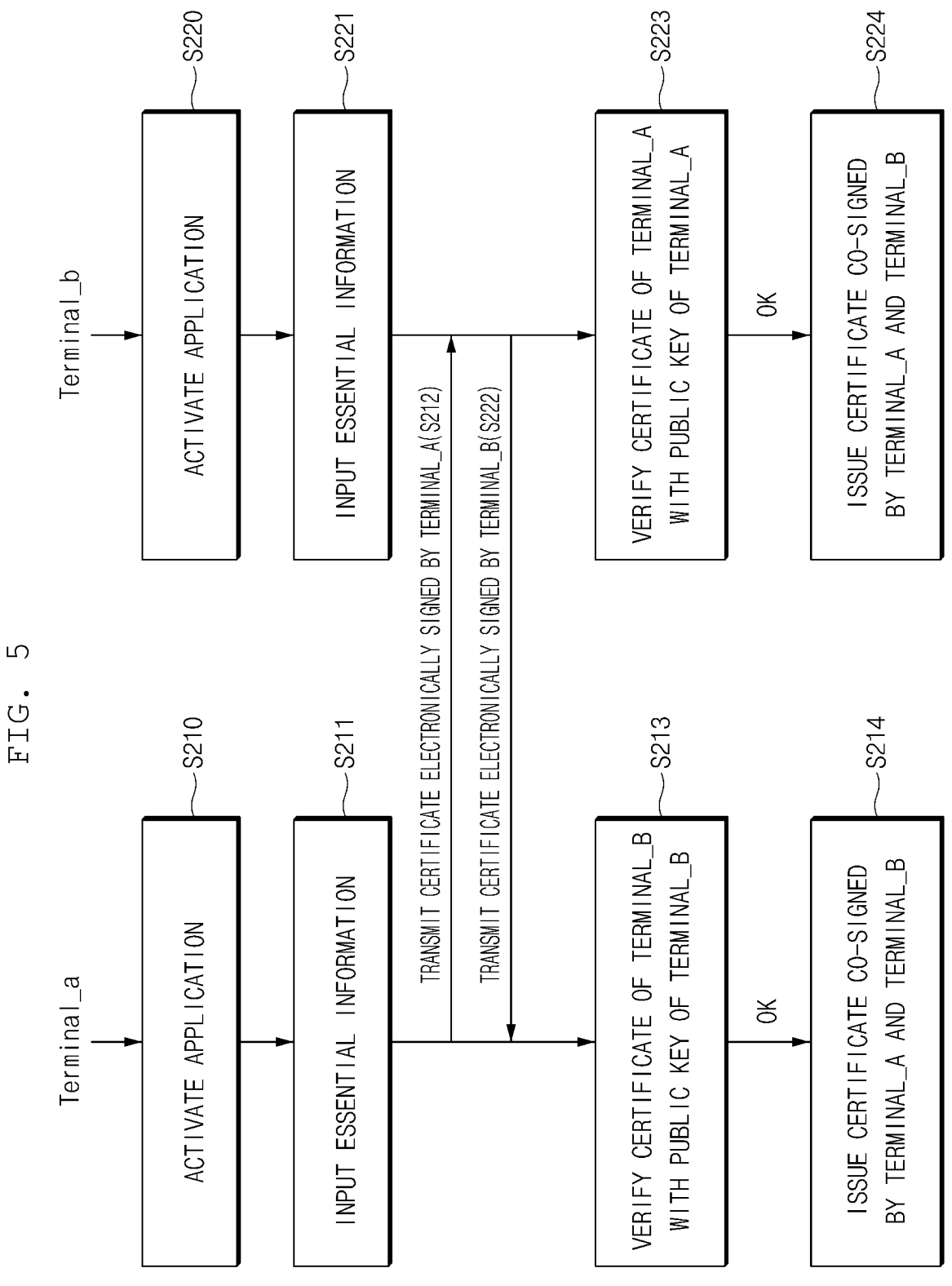
FIG. 5 is a flowchart for explaining a process of issuing certificates actually exchanged between an operator and a visitor as an example.

FIG. 5 is a flowchart for explaining a process of issuing certificates exchanged between an actual operator and a visitor as an example. The first terminal (Terminal_a) 110 is a terminal possessed by the operator, where an application of the user app unit 115 is activated (S210) and essential information necessary to issue a visit certificate is input (S211).

Information to be essentially input by the operator is a visit place, visit date and time, an operator's name, and the like, and the first terminal 110 transmits an electronically signed operator confirmation to the second terminal 120 (S212).

In this case, the second terminal (Terminal_b) 120 is a terminal possessed by the visitor, where an application of the user app unit 125 is activated (S220) and essential information necessary to issue a visit certificate is input (S221).

Information to be essentially input by the visitor is location information (latitude/longitude), a visitor's name, and the like, and the second terminal 120 transmits an electronically signed visit confirmation to the first terminal 110 (S222).

When the operator confirmation and the visit confirmation are exchanged between the terminals in Step S221 and Step S222, each terminal control unit verifies the received confirmation with the public key of the other terminal through the off-chain.

Specifically, the first terminal 110 verifies the received visit confirmation (second certificate) using the public key of the second terminal 120 registered on the off-chain 140 (S213), and the second terminal 120 verifies the received operator confirmation (first certificate) using the public key of the first terminal 110 registered on the off-chain 140 (S223).

When the verification of the received confirmation of the other terminal is completed in Step S213 and Step S223, it is possible to issue a co-signed visit certificate by combining the operator confirmation and the visit confirmation, respectively (S214, S224).

As described above, the integrated certificate according to the embodiment of the present invention may be any one of a class attendance certificate, an event attendance certificate, a meeting attendance certificate, a travel place visit certificate, a food and beverage transaction certificate, and a digital business card.

Hereinafter, a process of issuing various kinds of certificates according to specific embodiments will be described with reference to the accompanying drawings.

Figure 6:
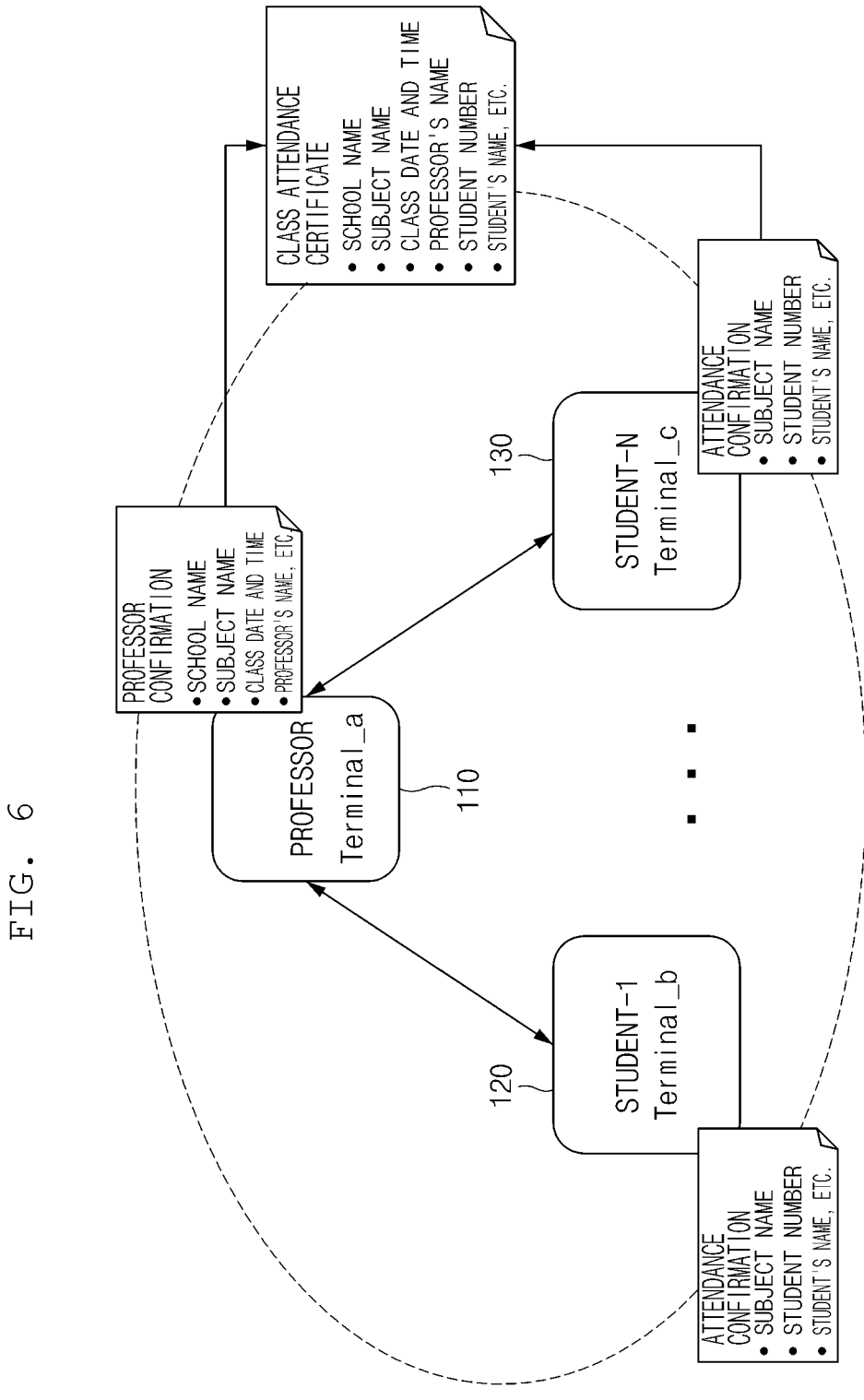
FIG. 6 is a reference diagram for explaining a process of issuing a class attendance certificate according to an embodiment of the present invention.

FIG. 6 is a reference diagram for explaining a process of issuing a class attendance certificate according to an embodiment of the present invention, and illustrates an example of a case where an integrated certificate is a class attendance certificate.

In the embodiment, it is described that the first terminal 110 is a terminal possessed by a professor, and the second terminal 120 is a terminal (Terminal_b) possessed by a student_1.

The student_1 runs an app of the second terminal 120 to activate a class attendance certificate icon set in an integrated certificate to be issued, clicks an attendance confirmation between the attendance confirmation to be generated by the student and a professor confirmation to be generated by the professor, and inputs essential information.

An attendance confirmation generated by inputting a subject name, a student number, a student's name, and the like as essential information to be input by the student is electronically signed. For the electronic signature, the user identifier and the private key stored in the storage unit are used as described above.

The professor also runs an app of the first terminal 110 to activate a class attendance certificate icon set in an integrated certificate to be issued, clicks a professor confirmation between an attendance confirmation to be generated by the student and the professor confirmation to be generated by the professor, and inputs essential information.

A professor confirmation generated by inputting a school name, a subject name, class date and time, a professor's name, and the like as essential information to be input by the professor is electronically signed in the same way.

When the electronic signature on each confirmation is completed, the terminals exchange the electronically signed confirmations with each other, respectively.

Specifically, the professor confirmation electronically signed in the first terminal 110 is transmitted to the second terminal 120 through the wireless communication module 111, and the attendance confirmation electronically signed in the second terminal 120 is transmitted to the first terminal 110 through the wireless communication unit 121.

The first terminal 110 receives the attendance confirmation with the electronic signature attached, verifies it with a public key of the corresponding student registered on the on/off-chain, and combines the generated professor confirmation and the attendance confirmation when the verification is completed to generate a co-signed class attendance certificate.

In addition, the second terminal 120 also receives the professor confirmation with the electronic signature attached, verifies it with a public key of the corresponding professor registered on the on/off-chain, and combines the generated attendance confirmation and the professor confirmation when the verification is completed to generate a co-signed class attendance certificate.

The class attendance certificate may include a school name, a subject name, class date and time, a professor's name, a student number, a student's name, and the like.

FIG. 7 is a reference diagram for explaining a process of issuing an event attendance certificate according to another embodiment of the present invention, and illustrates an example of a case where an integrated certificate is an event attendance certificate.

In the embodiment, it is described that the first terminal 110 is a terminal possessed by an organizer, and the second terminal 120 is a terminal (Terminal_b) possessed by an attendee_1.

The attendee_1 runs an app of the second terminal 120 to activate an event attendance certificate icon set in an integrated certificate to be issued, clicks an attendance confirmation between the attendance confirmation to be generated by the attendee and an organizer confirmation to be generated by the organizer, and inputs essential information.

An attendance confirmation generated by inputting an attendee workplace name, an attendee's name, and the like as essential information to be input by the attendee is electronically signed. For the electronic signature, the user identifier and the private key stored in the storage unit are used as described above.

The organizer also runs an app of the first terminal 110 to activate an event attendance certificate icon set in an integrated certificate to be issued, clicks an organizer confirmation between an attendance confirmation to be generated by the attendee and the organizer confirmation to be generated by the organizer, and inputs essential information.

An organizer confirmation generated by inputting an event name, an event period, an organizer's name, and the like as essential information to be input by the organizer is electronically signed in the same way.

When the electronic signature on each confirmation is completed, the terminals exchange the electronically signed confirmations with each other, respectively.

Specifically, the organizer confirmation electronically signed in the first terminal 110 is transmitted to the second terminal 120 through the wireless communication module 111, and the attendance confirmation electronically signed in the second terminal 120 is transmitted to the first terminal 110 through the wireless communication unit 121.

The first terminal 110 receives the attendance confirmation with the electronic signature attached, verifies it with a public key of the corresponding attendee registered on the on/off-chain, and combines the generated organizer confirmation and the attendance confirmation when the verification is completed to generate a co-signed event attendance certificate.

In addition, the second terminal 120 also receives the organizer confirmation with the electronic signature attached, verifies it with a public key of the corresponding organizer registered on the on/off-chain, and combines the generated attendance confirmation and the organizer confirmation when the verification is completed to generate a co-signed event attendance certificate.

The event attendance certificate may include an event name, an event period, an organizer's name, an attendee workplace name, an attendee's name, and the like.

Figure 8:
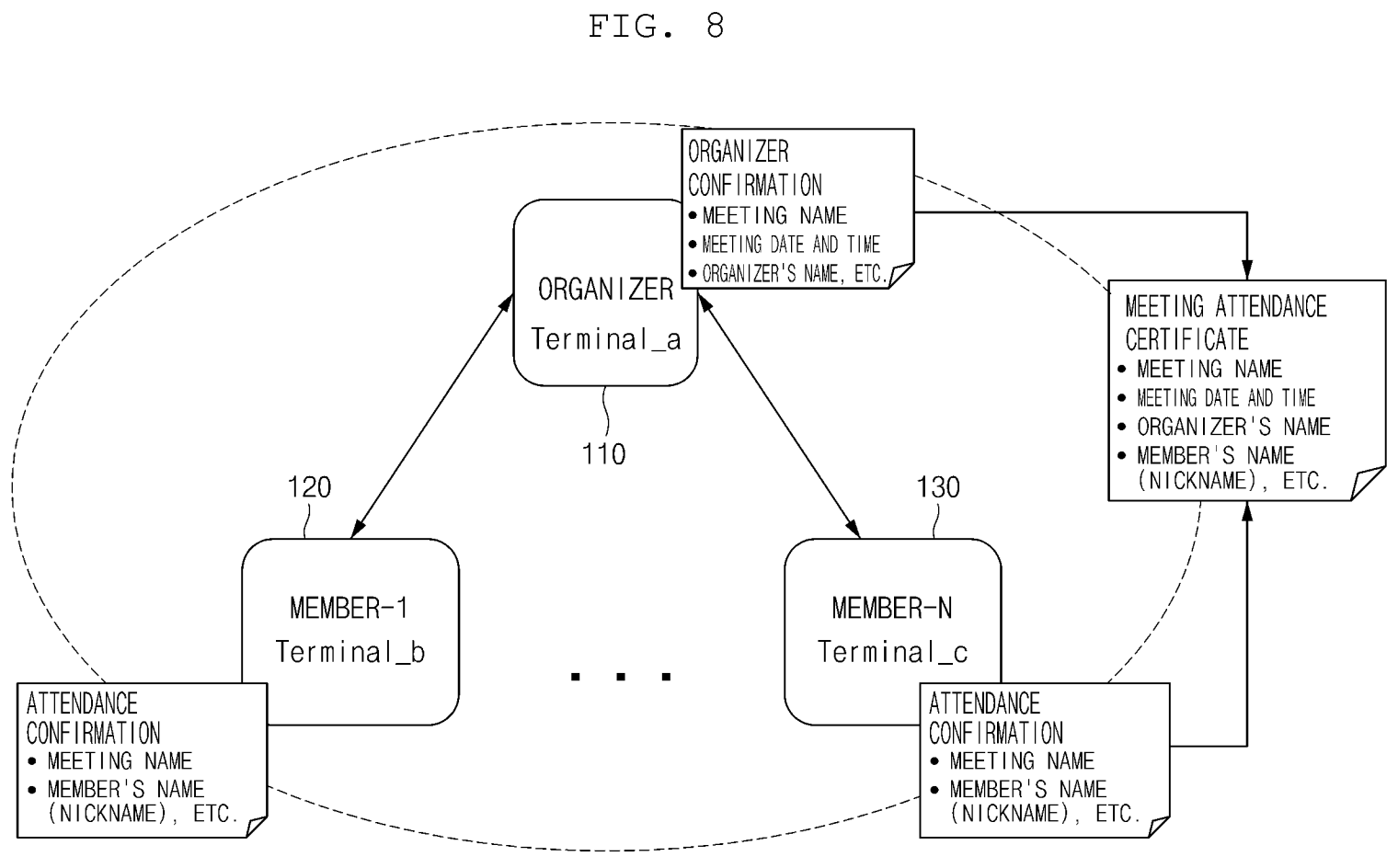

FIG. 8 is a reference diagram for explaining a process of issuing a meeting attendance certificate according to another embodiment of the present invention, and illustrates an example of a case where an integrated certificate is a meeting attendance certificate.

In the embodiment, it is described that the first terminal 110 is a terminal possessed by an organizer, and the second terminal 120 is a terminal (Terminal_b) possessed by a member_1.

The member_1 runs an app of the second terminal 120 to activate a meeting attendance certificate icon set in an integrated certificate to be issued, clicks an attendance confirmation between the attendance confirmation to be generated by the member and an organizer confirmation to be generated by the organizer, and inputs essential information.

An attendance confirmation generated by inputting a meeting name, a member's name (nickname), and the like as essential information to be input by the member is electronically signed. For the electronic signature, the user identifier and the private key stored in the storage unit are used as described above.

The organizer also runs an app of the first terminal 110 to activate a meeting attendance certificate icon set in an integrated certificate to be issued, clicks an organizer confirmation between an attendance confirmation to be generated by the member and the organizer confirmation to be generated by the organizer, and inputs essential information.

An organizer confirmation generated by inputting a meeting name, meeting date and time, and an organizer's name, and the like as essential information to be input by the organizer is electronically signed in the same way.

When the electronic signature on each confirmation is completed, the terminals exchange the electronically signed confirmations with each other, respectively.

Specifically, the organizer confirmation electronically signed in the first terminal 110 is transmitted to the second terminal 120 through the wireless communication module 111, and the attendance confirmation electronically signed in the second terminal 120 is transmitted to the first terminal 110 through the wireless communication unit 121.

The first terminal 110 receives the attendance confirmation with the electronic signature attached, verifies it with a public key of the corresponding member registered on the on/off-chain, and combines the generated organizer confirmation and the attendance confirmation when the verification is completed to generate a co-signed meeting attendance certificate.

In addition, the second terminal 120 also receives the organizer confirmation with the electronic signature attached, verifies it with a public key of the corresponding organizer registered on the on/off-chain, and combines the generated attendance confirmation and the organizer confirmation when the verification is completed to generate a co-signed meeting attendance certificate.

The meeting attendance certificate may include a meeting name, meeting date and time, an organizer's name, a member's name (nickname), and the like.

FIG. 9 is a reference diagram for explaining a process of issuing a travel place visit certificate according to another embodiment of the present invention, and illustrates an example of a case where an integrated certificate is a travel place visit certificate.

In the embodiment, it is described that the first terminal 110 is a terminal possessed by an operator, and the second terminal 120 is a terminal (Terminal_b) possessed by a visitor_1.

The visitor_1 runs an app of the second terminal 120 to activate a travel place visit certificate icon set in an integrated certificate to be issued, clicks a visit confirmation between the visit confirmation to be generated by the visitor and an operator confirmation to be generated by the operator, and inputs essential information.

A visit confirmation generated by inputting location information (latitude/longitude), a visitor's name, and the like as essential information to be input by the visitor is electronically signed. For the electronic signature, the user identifier and the private key stored in the storage unit are used as described above.

The location information (latitude/longitude) may be a general visit place, but the location is checked with latitude and longitude of the actual terminal holder to prevent proxy visits or false issuance of a certificate.

The operator also runs an app of the first terminal 110 to activate a travel place visit certificate icon set in an integrated certificate to be issued, clicks an operator confirmation between a visit confirmation to be generated by the visitor and the operator confirmation to be generated by the operator, and inputs essential information.

An operator confirmation generated by inputting a visit place, visit date and time, an operator's name, and the like as essential information to be input by the organizer is electronically signed in the same way.

When the electronic signature on each confirmation is completed, the terminals exchange the electronically signed confirmations with each other, respectively.

Specifically, the operator confirmation electronically signed in the first terminal 110 is transmitted to the second terminal 120 through the wireless communication module 111, and the visit confirmation electronically signed in the second terminal 120 is transmitted to the first terminal 110 through the wireless communication unit 121.

The first terminal 110 receives the visit confirmation with the electronic signature attached, verifies it with a public key of the corresponding visitor registered on the on/off-chain, and combines the generated operator confirmation and the visit confirmation when the verification is completed to generate a co=signed travel place visit certificate.

In addition, the second terminal 120 also receives the operator confirmation with the electronic signature attached, verifies it with a public key of the corresponding operator registered on the on/off-chain, and combines the generated visit confirmation and the operator confirmation when the verification is completed to generate a co-signed travel place visit certificate.

The travel place visit certificate may include a visit plate, location information (latitude/longitude), visit date and time, an operator's name, a visitor's name, and the like.

Figure 10:
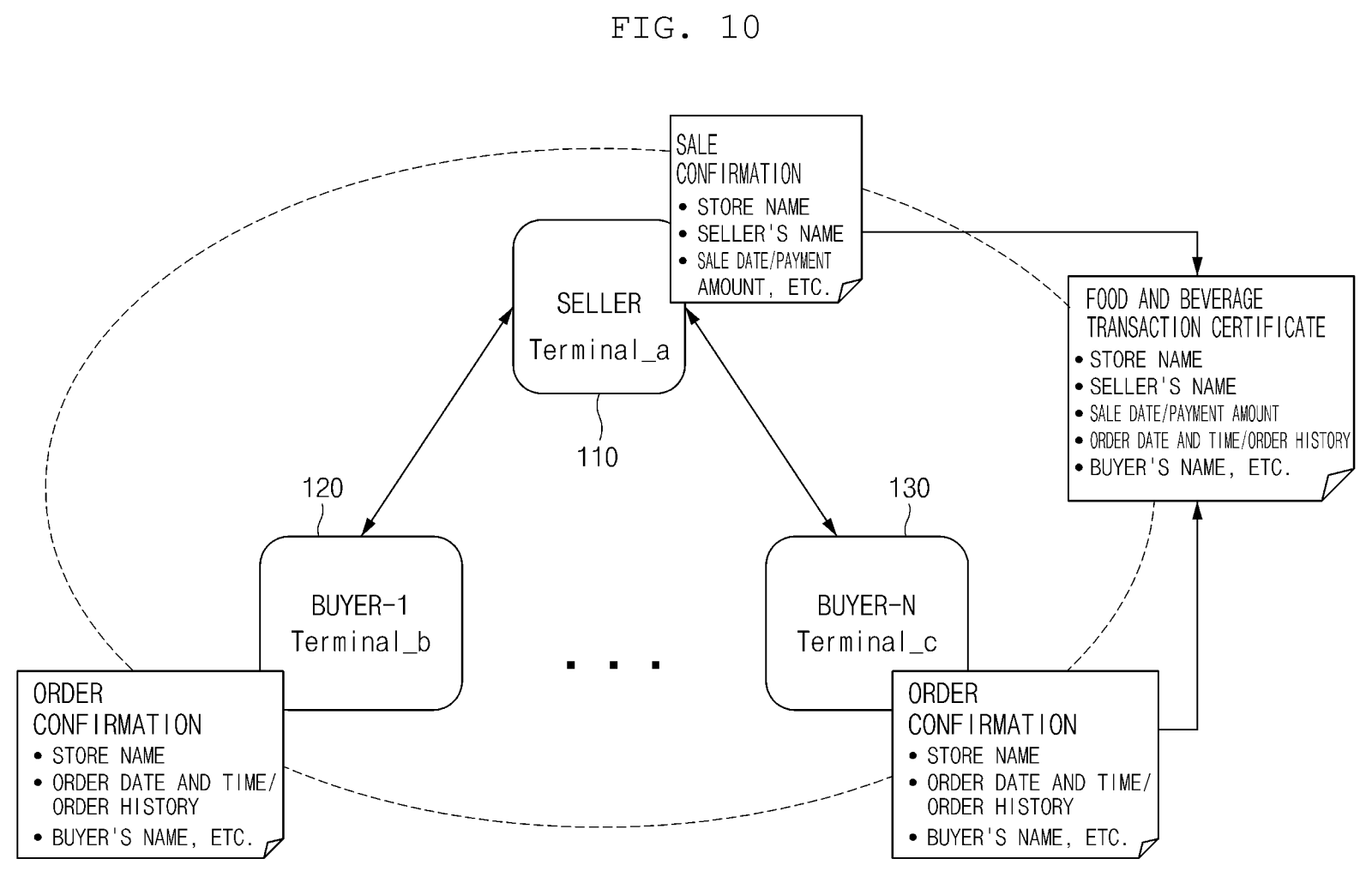

FIG. 10 is a reference diagram for explaining a process of issuing a transaction certificate according to another embodiment of the present invention, and illustrates an example of a case where an integrated certificate is a food and beverage transaction certificate.

In the embodiment, a method for verifying food and beverage transaction is described, but it is obvious that the certificate can be used as a certificate for various transactions by only modifying the transaction content.

In the embodiment, it is described that the first terminal 110 is a terminal possessed by a seller, and the second terminal 120 is a terminal (Terminal_b) possessed by an buyer 1.

The orderer_1 runs an app of the second terminal 120 to activate a food and beverage transaction certificate icon set in an integrated certificate to be issued, clicks an order confirmation between the order confirmation to be generated by the buyer and a sale confirmation to be generated by the seller, and inputs essential information.

An order confirmation generated by inputting a store name, order date and time, an order history, a buyer's name, and the like as essential information to be input by the buyer is electronically signed. For the electronic signature, the user identifier and the private key stored in the storage unit are used as described above.

The seller also runs an app of the first terminal 110 to activate a food and beverage transaction certificate icon set in an integrated certificate to be issued, clicks a sale confirmation between an order confirmation to be generated by the buyer and the sale confirmation to be generated by the seller, and inputs essential information.

A sale confirmation generated by inputting a seller's name, sale date and time, a payment amount, and the like as essential information to be input by the seller is electronically signed in the same way.

When the electronic signature on each confirmation is completed, the terminals exchange the electronically signed confirmations with each other, respectively.

Specifically, the sale confirmation electronically signed in the first terminal 110 is transmitted to the second terminal 120 through the wireless communication module 111, and the order confirmation electronically signed in the second terminal 120 is transmitted to the first terminal 110 through the wireless communication unit 121.

The first terminal 110 receives the order confirmation with the electronic signature attached, verifies it with a public key of the corresponding buyer registered on the on/off-chain, and combines the generated sale confirmation and the order confirmation when the verification is completed to generate a co-signed food and beverage transaction certificate.

In addition, the second terminal 120 also receives the sale confirmation with the electronic signature attached, verifies it with a public key of the corresponding seller registered on the on/off-chain, and combines the generated order confirmation and the sale confirmation when the verification is completed to generate a co-signed food and beverage transaction certificate.

The food and beverage transaction certificate may include a store name, a seller's name, sale date and time, a payment amount, order date and time, an order history, a buyer's name, and the like.

Figure 11:
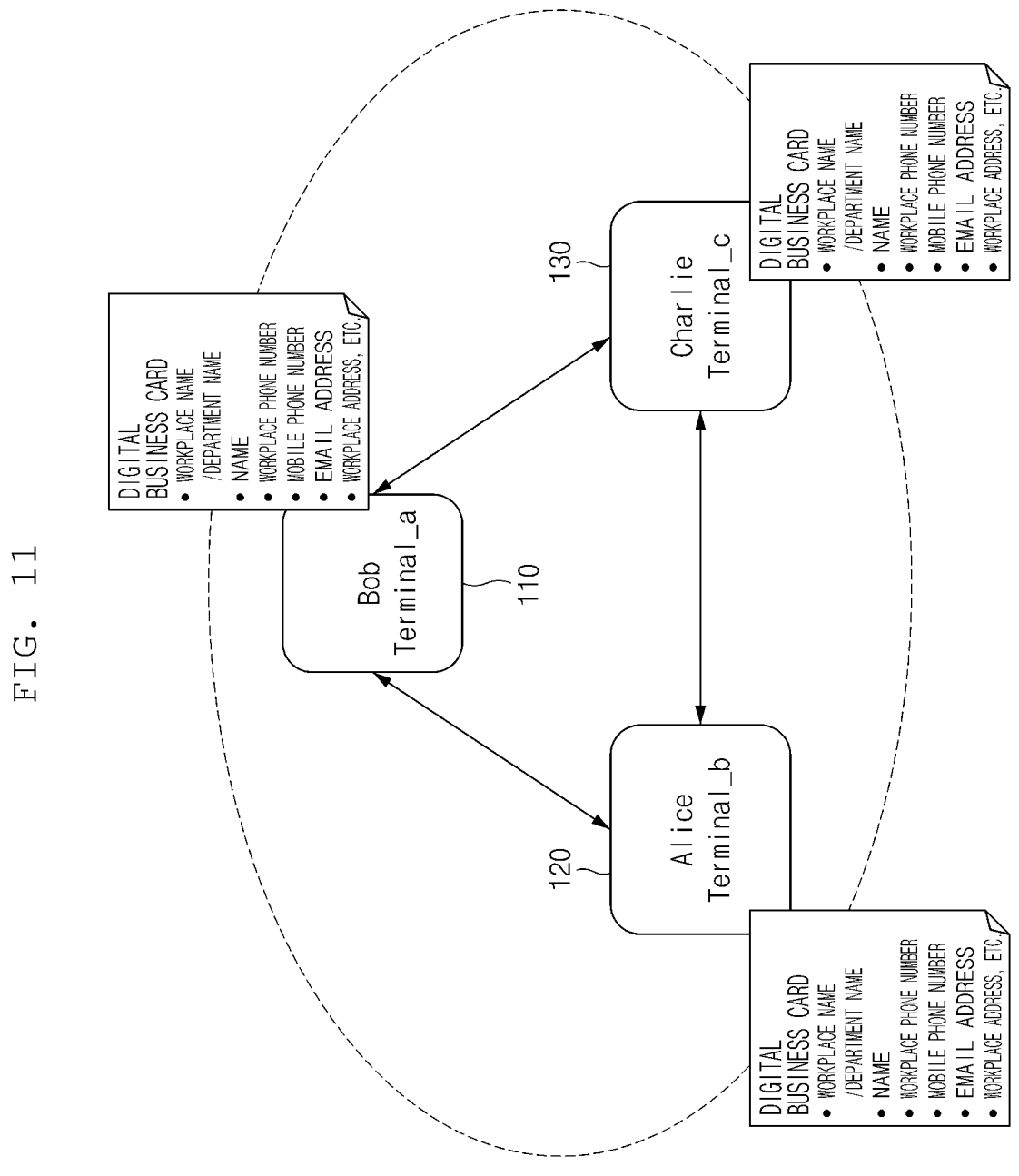
FIG. 11 is a reference diagram for explaining a process of exchanging digital business cards according to another embodiment of the present invention.

FIG. 11 is a reference diagram for explaining a process of exchanging digital business cards according to another embodiment of the present invention, and illustrates an example of a case where an integrated certificate is a digital business card.

In the embodiment, it is described that the first terminal 110 and the second terminal 120 are target terminals to exchange business cards.

An app of the second terminal 120 operating as one's terminal is run to activate a digital business card icon set in an integrated certificate to be issued, and essential information is input.

A first digital business card confirmation generated by inputting a workplace name/a department name, a name, a workplace phone number, a mobile phone number, an email address, a workplace address, and the like as essential information to generate such a digital business card is electronically signed. For the electronic signature, the user identifier and the private key stored in the storage unit are used as described above.

Also, the first terminal 110 operating as the other's terminal to exchange a digital business card runs an app to activate a digital business card icon set in an integrated certificate to be issued, and inputs essential information.

A second digital business card confirmation generated by inputting a workplace name/a department name, a name, a workplace phone number, a mobile phone number, an email address, a workplace address, and the like as such essential information to generate such a digital business card is electronically signed in the same way.

When the electronic signature on each digital business card is completed, the terminals exchange the electronically signed digital business cards with each other.

Specifically, the first digital business card confirmation electronically signed in the first terminal 110 is transmitted to the second terminal 120 through the wireless communication module 111, and the second digital business card confirmation electronically signed in the second terminal 120 is transmitted to the first terminal 110 through the wireless communication unit 121.

The first terminal 110 receives the second digital business card confirmation with the electronic signature attached, verifies it with a public key of the second terminal holder registered on the on/off-chain, and combines the verified second digital business card confirmation and the date and time of exchange to generate a digital business card.

In addition, the second terminal 120 also receives the first digital business card confirmation with the electronic signature attached, verifies it with a public key of the first terminal holder registered on the on/off-chain, and combines the verified second digital business card confirmation and the date and time of exchange when the verification is completed, to generate a digital business card.

As described above, according to the person-to-person non-face-to-face identify verification system using wireless communication of the present invention, the electronically signed certificates are exchanged with each other, the received certificate is verified by the public key of the certificate generator, and the integrated certificate is generated when the verification is completed. Accordingly, since the wireless communication is used, it is possible to exchange the certificates person-to-person non-face-to-face. Therefore, an organizer of an event, a workshop, a conference, an exhibition, or a meeting can quickly and accurately check the event attendance of a large number of attendees located in an event hall at the same time.

Although the present invention has been described in detail with respect to the specific embodiments described above, it is obvious to those skilled in the art that various changes and modifications are possible within the scope of the technical idea of the present invention, and it is natural that such changes and modifications fall within the scope of the appended claims.

INDUSTRIAL APPLICABILITY

The present invention can be used in a person-to-person non-face-to-face identity verification system using wireless communication without leakage of personal information in the on/off-chain.

The invention claimed is:

1. A person-to-person non-face-to-face identity verification apparatus using wireless communication, in which one or more of user registration information including user identifier, public key, copy of encryption key, and terminal identifier are registered on an off-chain or an on-chain, and which is operated for terminals in which the user registration information is registered to exchange electronically signed certificates, comprising:

a first terminal equipped with a first terminal control unit which generates a first certificate signed with a user identifier and a private key of a terminal user, transmits the first certificate to a second terminal through short range communication, receives a second certificate signed with a user identifier of a terminal user of the second terminal and a private key from the second terminal, and verifies the received second certificate with a public key of the second terminal registered on on/off-chain; and a second terminal equipped with a second terminal control unit which generates a second certificate signed with a user identifier and a private key of a terminal user, transmits the second certificate to the first terminal through short range communication, receives the first certificate signed with a user identifier and the private key of the terminal user of the first terminal, and verifies the received first certificate with a public key of the first terminal registered on the on/off-chain, wherein when the received second certificate is verified, the first terminal combines the first certificate and the verified second certificate to generate a co-signed integrated certificate, and when the received first certificate is verified, the second terminal combines the second certificate and the verified first certificate to generate a co-signed integrated certificate.

2. The person-to-person non-face-to-face identity verification apparatus using wireless communication according to claim 1, wherein the first or second terminal includes:

a wireless communication module;

a user app unit which keeps a certificate, a private key, and an original encryption key in the terminal, verifies a received certificate with a public key of the other terminal registered on the on/off-chain, and is operated to transmit the certificate signed with the user identifier of the terminal and the private key to the other terminal through the wireless communication module; and a control unit which combines, when the certificate transmitted from the other terminal in the user app unit is verified, the certificate signed with the user identifier generated in the terminal and the private key and the verified certificate received from the other terminal, and controls a terminal display unit to display the co-signed certificate of each terminal.

3. The person-to-person non-face-to-face identity verification apparatus using wireless communication according to claim 2, wherein the user app unit includes:

an encryption key management module which manages encryption keys;

a personal information management module which receives an encryption key from the encryption key management module and encrypts and decrypts personal information; and an identity certificate management module which receives personal information from the personal information management module at the time of generating a first or second certificate, receives a private key from the encryption key management module, generates an electronically signed certificate, and is operated to receive or transmit the electronically signed first or second certificate through the wireless communication module.

4. The person-to-person non-face-to-face identity verification apparatus using wireless communication according to claim 3, wherein when the integrated certificate is a class attendance certificate, the first terminal is a terminal possessed by a student and the second terminal is a terminal possessed by a professor, wherein the first terminal generates an attendance configuration including a subject name, a student number, and a student's name, electronically signs the attendance confirmation, transmits the attendance confirmation to the second terminal through the wireless communication module, receives a professor confirmation including a school name, a subject name, class date and time, and a professor's name electronically signed in the second terminal, verifies the professor confirmation with a public key of the corresponding professor, and combines the attendance confirmation and the professor confirmation to generate a class attendance certificate when the verification is completed, and wherein the second terminal generates a professor confirmation including a school name, a subject name, class date and time, and a professor's name, electronically signs the professor confirmation, transmits the professor confirmation to the first terminal through the wireless communication module, receives the attendance confirmation with electronic signature attached from the first terminal, verifies the attendance confirmation with a public key of the corresponding student, and combines the attendance confirmation and the professor confirmation to generate a class attendance certificate when the verification is completed.

5. The person-to-person non-face-to-face identity verification apparatus using wireless communication according to claim 3, wherein when the integrated certificate is an event attendance certificate, the first terminal is a terminal possessed by an attendee and the second terminal is a terminal possessed by an organizer, wherein the first terminal generates an attendance confirmation including an event name, an attendee workplace name, and an attendee's name, electronically signs the attendance confirmation, transmits the attendance confirmation to the second terminal through the wireless communication module, receives an organizer confirmation including an event name, an event period, and an organizer's name electronically signed in the second terminal, verifies the organizer confirmation with a public key of the corresponding organizer, and combines the attendance confirmation and the organizer confirmation to generate an event attendance certificate when the verification is completed, and wherein the second terminal generates an organizer confirmation including an event name, an event period, and an organizer's name, electronically signs the organizer confirmation, transmits the organizer confirmation to the first terminal through the wireless communication module, receives the attendance confirmation with electronic signature attached from the first terminal, verifies the attendance confirmation with a public key of the corresponding attendee, and combines the organizer confirmation and the attendance confirmation to generate an event attendance certificate when the verification is completed.

6. The person-to-person non-face-to-face identity verification apparatus using wireless communication according to claim 3, wherein when the integrated certificate is a meeting attendance certificate, the first terminal is a terminal possessed by an attendee and the second terminal is a terminal possessed by an organizer, wherein the first terminal generates an attendance confirmation including a meeting name and a member's name, electronically signs the attendance confirmation, transmits the attendance confirmation to the second terminal through the wireless communication module, receives an organizer confirmation including a meeting name, meeting date and time, and an organizer's name electronically signed in the second terminal, verifies the organizer confirmation with a public key of the corresponding organizer, and combines the attendance confirmation and the organizer confirmation to generate an event attendance certificate when the verification is completed, and wherein the second terminal generates an organizer confirmation including a meeting name, meeting date and time, and an organizer's name, electronically signs the organizer confirmation, transmits the organizer confirmation to the first terminal through the wireless communication module, receives the attendance confirmation with electronic signature attached from the first terminal, verifies the attendance confirmation with a public key of the corresponding attendee, and combines the organizer confirmation and the attendance confirmation to generate an event attendance certificate when the verification is completed.

7. The person-to-person non-face-to-face identity verification apparatus using wireless communication according to claim 3, wherein when the integrated certificate is a travel place visit certificate, the first terminal is a terminal possessed by a visitor and the second terminal is a terminal possessed by an operator, wherein the first terminal generates a visit confirmation including location information (latitude/longitude) and a visitor's name, electronically signs the visit confirmation, transmits the visit confirmation to the second terminal through the wireless communication module, receives an operator confirmation including a visit place, visit date and time, and an operator's name electronically signed in the second terminal, verifies the operator confirmation with a public key of the corresponding operator, and combines the visit confirmation and the operator confirmation to generate a travel place visit certificate when the verification is completed, and wherein the second terminal generates an operator confirmation including a visit place, visit date and time, and an operator's name, electronically signs the operator confirmation, transmits the operator confirmation to the first terminal through the wireless communication module, receives the visit confirmation with electronic signature attached from the first terminal, verifies the visit confirmation with a public key of the corresponding visitor, and combines the operator confirmation and the visit confirmation to generate a travel place visit certificate when the verification is completed.

8. The person-to-person non-face-to-face identity verification apparatus using wireless communication according to claim 3, wherein when the integrated certificate is a food and beverage transaction certificate, the first terminal is a terminal possessed by a buyer and the second terminal is a terminal possessed by a seller, wherein the first terminal generates an order confirmation including a store name, order date and time, and a buyer's name, electronically signs the order confirmation, transmits the order confirmation to the second terminal through the wireless communication module, receives a sale confirmation including a store name, a seller's name, sale date and time, and a payment amount electronically signed in the second terminal, verifies the sale confirmation with a public key of the corresponding seller, and combines the order confirmation and the sale confirmation to a food and beverage transaction certificate when the verification is completed, and wherein the second terminal generates a sale confirmation including a store name, a seller's name, sale date and time, and a payment amount, electronically signs the sale confirmation, transmits the sale confirmation to the first terminal through the wireless communication module, receives the order confirmation with electronic signature attached from the first terminal, verifies the order confirmation with a public key of the corresponding buyer, and combines the sale confirmation and the order confirmation to generate a food and beverage transaction certificate when the verification is completed.

9. The person-to-person non-face-to-face identity verification apparatus using wireless communication according to claim 3, wherein when the integrated certificate is a digital business card, the first terminal and the second terminal are target terminals exchanging business cards, wherein the first terminal generates a first digital business card including a workplace name, a department name, a name, a workplace phone number, a mobile phone number, an email address, and a workplace address, electronically signs the first digital business card, transmits the first digital business card to the second terminal through the wireless communication module, receives a second digital business card including a workplace name, a department name, a name, a workplace phone number, a mobile phone number, an email address, and a workplace address electronically signed in the second terminal, verifies the second digital business card with a public key of the corresponding second terminal holder, and attaches exchange date and time to the verified and exchanged digital business cards to generate a digital business card certificate when the verification is completed, and wherein the second terminal generates a second digital business card including a workplace name, a department name, a name, a workplace phone number, a mobile phone number, an email address, and a workplace address, electronically signs the second digital business card, transmits the second digital business card to the first terminal through the wireless communication module, receives the first digital business card with electronic signature attached from the first terminal, verifies the first digital business card with a public key of the corresponding first terminal holder, and attaches exchange date and time to the verified and exchanged digital business cards to generate a digital business card certificate when the verification is completed.

* * * * *